C. C. TRACY.
Plumbers' Traps.
No. 151,065.                                            Patented May 19, 1874.
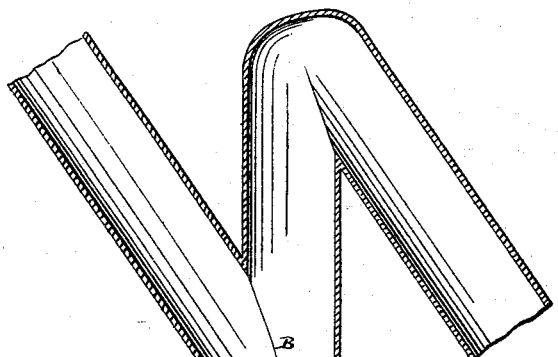
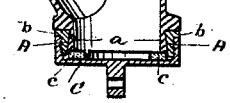
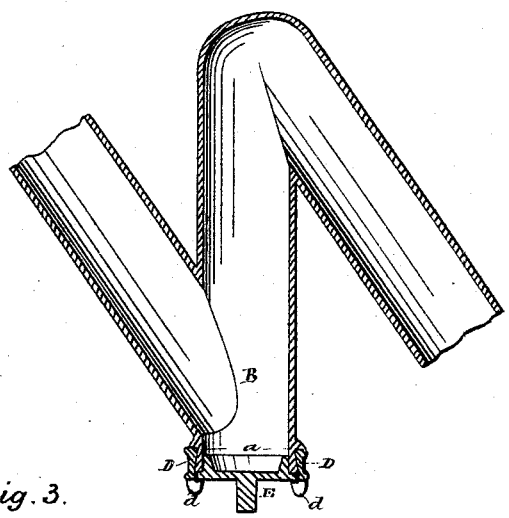
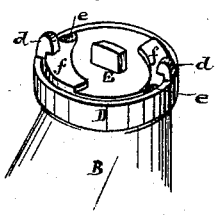

UNITED STATES PATENT OFFICE.

CHRISTOPHER C. TRACY, OF NEW YORK, N. Y., ASSIGNOR TO WILLIAM A. SHAW MANUFACTURING COMPANY, OF SAME PLACE.

IMPROVEMENT IN PLUMBERS' TRAPS.

Specification forming part of Letters Patent No. 151,065, dated May 19, 1874; application filed May 6, 1874.

*To all whom it may concern:*

Be it known that I, CHRISTOPHER C. TRACY, of the city, county, and State of New York, have invented certain new and useful Improvements in Plumbers' Traps, of which the following is a specification:

This invention relates to the removable plug which is sometimes provided at the lower bend of a trap, at which point, settlings may clog and obstruct the trap, if not taken out. I locate the plug holding collar or seat on the exterior of the neck of the trap at the lower bend, and bevel or equivalently form the inner surface of said annular collar, so that when casting the trap the metal that forms the latter will run between the beveled or equivalently-formed inner face of the collar, and the core around which the trap is cast, thus forming a joint that will dovetail or lock the collar securely on the neck of the trap formed at the point to which the collar is applied. The collar is thus external to the trap, and the opening is left of the full diameter of the body of the trap, and without obstruction. The trap at that point is also strengthened and re-enforced by the encompassing collar, which is removed from contact with the water and sediment in the trap, and is not liable to be clogged by matter which would otherwise lodge in the screw-thread usually formed in it to receive a screw-plug.

The nature of my invention and the manner in which the same is or may be carried into effect, will be understood by reference to the accompanying drawing, in which—

Figure 1 is a longitudinal central section of a trap made in accordance with my invention. Fig. 2 is a like section of a trap also embodying my invention, with a slightly different style of plug. Fig. 3 is a perspective view of the lower bend of the trap in Fig. 2.

A is an externally screw-threaded collar of brass, or other suitable metal, at the lower bend of the trap B. This collar is beveled on its inner surface, as shown, so as to be thicker at top than at bottom, and is of sufficiently greater diameter than the interior or bore of the trap, to allow the metal of the trap to run between its beveled inner surface and the body of the core used to form the trap, as indicated in the drawing, *a* being the metal neck of the trap run inside of the collar, and having the same diameter as the main body of the trap.

The collar is readily applied when casting the trap, it being provided with a shoulder or annular flange, *b*, which fits snugly within the mold, and the collar itself rests on a ledge on the core, of a suitable shape to receive it, and, preferably, to prevent the metal of the neck *a* from extending down as far as the outer end of the collar.

In lieu of forming the collar with a beveled internal face, it may be provided on that face with inwardly-projecting lugs, which will answer to interlock with the neck of the trap. But I prefer the dovetailed formation shown, and, if desired, for greater security, one, two, or more, holes may be hosed in the collar, to allow the metal to enter therein.

The plug is indicated at C, of a cap-like form, with internal screw-thread, to encompass the collar, and engage the external or male screw thereon. Between the end of neck *a* and the cap, may be interposed a washer, *c*, of leather, or other suitable material.

The advantages of the above arrangement have been before specified, and need not be here repeated.

In Figs. 2 and 3 is represented another form of plug. The collar D is combined and united with the neck *a* of the trap in precisely the same way as before described, with reference to collar *a*. The only difference is that in the present case, the collar is not screw-threaded, but has lugs *d* to hold a plug, E, in place. This plug enters the collar, and rests on the end of neck *a*. It is provided with notches *e*, to permit it to pass the lugs *d*, when entering the collar, and with inclines *f*, which, when the plug after having been so entered is rotated, will be brought under the lugs *d*, and will cause th plug to be pressed against the end of the neck $a$, and firmly clamped between the same and the lugs, making a tight joint.

Having now described my invention, what I claim and desire to secure by Letters Patent, is—

The combination, with the trap, of the plug-holding collar, external to the body of the trap, and united therewith during the casting of the trap by a dovetailed joint, or its specified equivalent, in the manner and for the purposes shown and set forth.

In testimony whereof I have hereunto signed my name this 29th day of April, A. D. 1874.

CHRISTOPHER C. TRACY.

Witnesses:
    FRED. KINGMAN,
    W. N. SHAW.